United States Patent

[11] 3,595,373

| [72] | Inventor | Samuel C. Warren<br>Vanderburgh County, Ind. |
|---|---|---|
| [21] | Appl. No. | 814,613 |
| [22] | Filed | Apr. 9, 1969 |
| [45] | Patented | July 27, 1971 |
| [73] | Assignee | George Koch Sons Inc.<br>Evansville, Ind. |

[54] CONVEYOR TRANSFER STRUCTURE
4 Claims, 3 Drawing Figs.

[52] U.S. Cl. .................................................. 198/45, 198/75
[51] Int. Cl. ...................................................... B65g 47/00
[50] Field of Search ........................................... 198/45, 173, 78, 32, 79, 102, 80, 20, 103, 75, 181, 33.2, 84; 214/6 FS

[56] References Cited
UNITED STATES PATENTS

| 2,017,044 | 10/1935 | Graf | 217/MO DIG. |
| 2,623,802 | 12/1952 | Bulk | 198/41 |
| 2,640,580 | 6/1953 | De Burgh | 198/33.2 |
| 2,841,433 | 7/1958 | Pagdin | 214/6 FS |

*Primary Examiner*—Richard E. Aegerter
*Attorney*—Warren D. Flackbert

ABSTRACT: A conveyor transfer structure characterized by the use of magnetic means for controlling conveyor pallet movement at the intersection of two conveyor lines.

PATENTED JUL 27 1971  3,595,373

INVENTOR
SAMUEL C. WARREN

BY Warren D. Hackbert
ATTORNEY

CONVEYOR TRANSFER STRUCTURE

As is known, the use of floor conveyors is widespread, such type being as described in the DeBurgh U.S. Pat. Nos. 2,640,580 and 2,640,607. In many conveyor installations, conveyor lines intersect, as, for example, from a storage line to another line. Heretofore, a problem has existed in controlling the movement of a pallet when the latter is moved from one line to another intersecting line. More particularly, pallet had the tendency to "bounce" from its desired position on the new line, resulting in, oftentimes, the missing of any engagement by the pusher dogs on the moving conveyor chain of such line.

The invention simply and directly provides for the use of magnetic means for positioning a metal or metal edged pallet coming from the intersecting line, without any rebounding, until a pusher dog engages the pallet pin. Briefly, the invention rotates a conventional skate rail section into a horizontal plane, i.e. the wheels thereof rotate on a vertical axis, and utilizes magnetic means between the wheels for acting upon and positioning the pallet upon transfer from one line to an intersecting line. In other words, and as stated, the pallet is positioned for effective pickup by the next upstanding pusher dog on the conveyor chain.

A better understanding of the present invention will become more apparent from the following description, taken in conjunction with the accompanying drawing, wherein FIG. 1 is a plan view of the invention shown in connection with the intersection of two conveyor lines;

Figure 1:
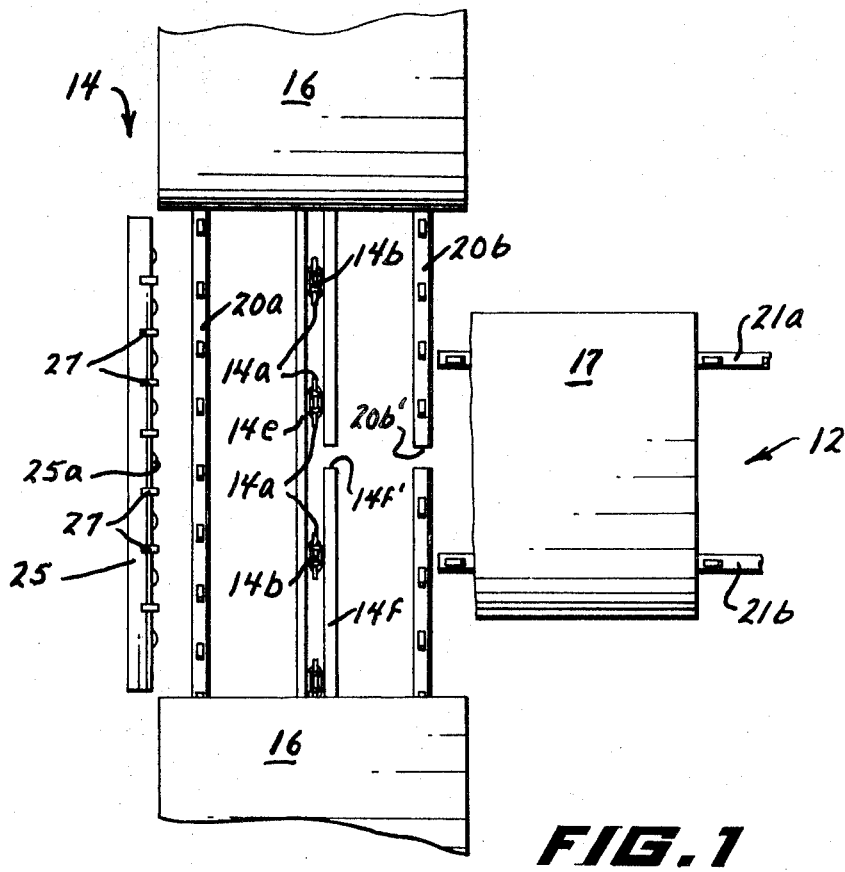
Figure 2:
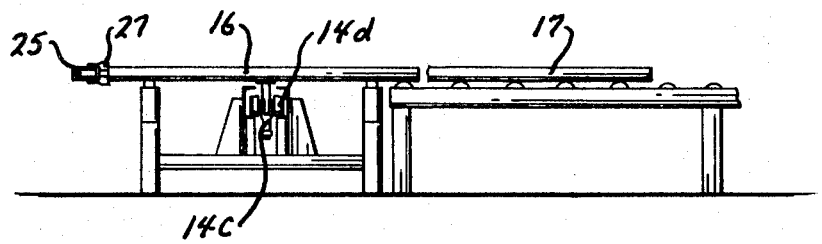
FIG. 2 is a view in elevation, corresponding to that of FIG. 1.
Figure 3:
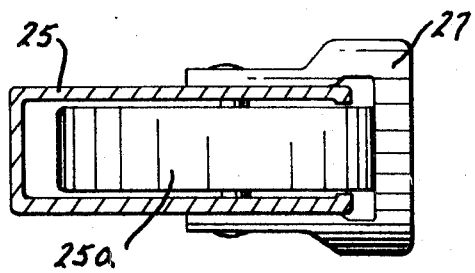
FIG. 3 is a detailed view, in vertical section, showing a magnet in a typical combination with a skate rail.

For the purposes of promoting a better understanding of the principles of the invention, reference will now be made to the embodiment illustrated in the drawing and specific language will be used to describe the same. It will nevertheless be understood that no limitation of the scope of the invention is thereby intended, such alterations and further modifications of the illustrated device and such further applications of the principles of the invention as illustrated therein being contemplated as would normally occur to one skilled in the art to which the invention relates.

Referring now to the figures, and FIG. 1 in particular, two conveyor lines 12 and 14 are shown intersecting, where, by way of example, conveyor line 12 may be a storage line, while conveyor 14 might be a manufacturing conveyor line. In any event, each conveyor line includes known metal or metal edged pallets 16 and 17, respectively movable along skate rails 20a and 20b and skate rails 21a and 21b, the latter all being conventional in structure.

Conveyor line 14 has a drive chain 14a (shown fragmentary) supported by intermediate trolleys 14b and pusher trolleys 14c, each being positioned by wheels 14d which move along channels 14e and 14f. A portion of each pusher trolley 14c extends upwardly to engage known pallet pins which extend downwardly from the undersurface of the pallets 16 and 17.

As a matter of ease in presentation of the invention, conveyor line 12, being a storage conveyor, may not utilize a drive chain, but, instead, the desired pallets are manually moved onto the conveyor line 14. It should be understood, however, that a drive arrangement, similar to that described above, could be employed in conveyor line 12, being timed, movementwise with respect to the movement of conveyor line 14.

In accordance with the teachings of the invention, a section of skate rail 25 is disposed normal to or in blocking relationship with respect to the intersecting conveyor line 12 and in a horizontal plane, i.e. the skate wheels 25a thereof rotate on a vertical axis. A series of permanent magnets 27 are disposed on the skate rail 25 between the skate wheels 25a. The magnets 27 may be positioned in any desired manner, such as, for example, by bolting, clamping or the like. It should be noted that the vertical position of the skate rail 25 is such that the skate wheels 25a and the magnets 27 will selectively engage the leading edge of any pallet 17 moving from conveyor line 12 onto conveyor line 14.

In use, when a pallet 17 is moved from conveyor line 12 to conveyor line 14, either manually or by reason of a conveyor chain, the pallet 17 moves across an opening 20b' in skate rail 20b which permits passage of the depending pallet pin, as well as through an opening 14f' in channel 14f which also serves the same purpose. The pallet 17 comes into contact with skate rail 25 and is magnetically positioned thereto by reason of the magnets 27 cooperating with the metal or metal edged pallet 17. The pallet 17 remains in such position, without bouncing or rebounding, until a pusher trolley 14c comes along and moves the pallet 17 along the conveyor line 14. It should be noted that the operation is timed so that the pallet pin of pallet 17 passes through opening 14f' in channel 14 when no wheel 14d is at such opening.

From the preceding, it should be apparent that the invention affords an important advantage in the transfer of a pallet from one conveyor line to another conveyor line. The invention precludes any bouncing or rebounding of the transferred pallet, and permits the pallet to be orderly moved when a dog on a pusher trolley on the conveyor engages the pallet pin thereof. Thus, the invention is highly effective in use, and is defined by the following claims.

I claim:

1. In a conveyor installation having a first conveyor line intersecting a second conveyor line and a pallet adapted to be transferred from said first conveyor line to said second conveyor line, said second conveyor line having a transporting means, a member disposed adjacent said second conveyor line in blocking relationship with respect to said first conveyor line, said member having magnetic means forming a part thereof selectively positioning said pallet for engagement with said transporting means.

2. The conveyor installation of claim 1 where said member is a skate rail.

3. The conveyor installation of claim 1 where said magnetic means are in substantially the same plane as the leading edge of said pallet.

4. The conveyor installation of claim 1 where said second conveyor line has skate rails and where said member is positioned alongside the said skate rail furthest from said first conveyor line.